May 25, 1954
T. A. RUEPP
2,679,316
APPARATUS FOR DRYING AND SEPARATING DUST FROM CRUSHED OR COMMINUTED MATERIALS
Filed March 7, 1950
4 Sheets-Sheet 1
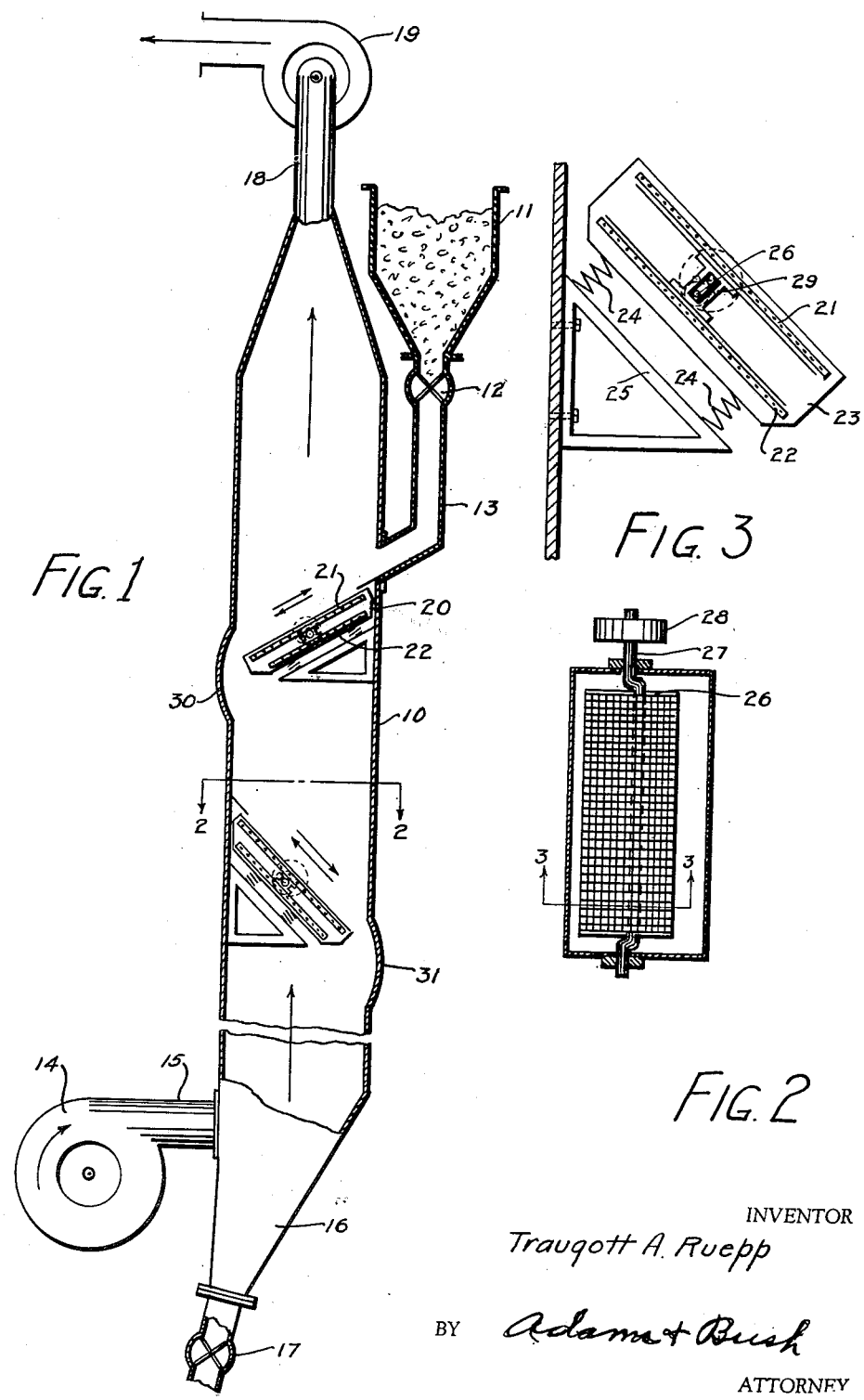
INVENTOR
Traugott A. Ruepp
BY Adams + Bush
ATTORNEY

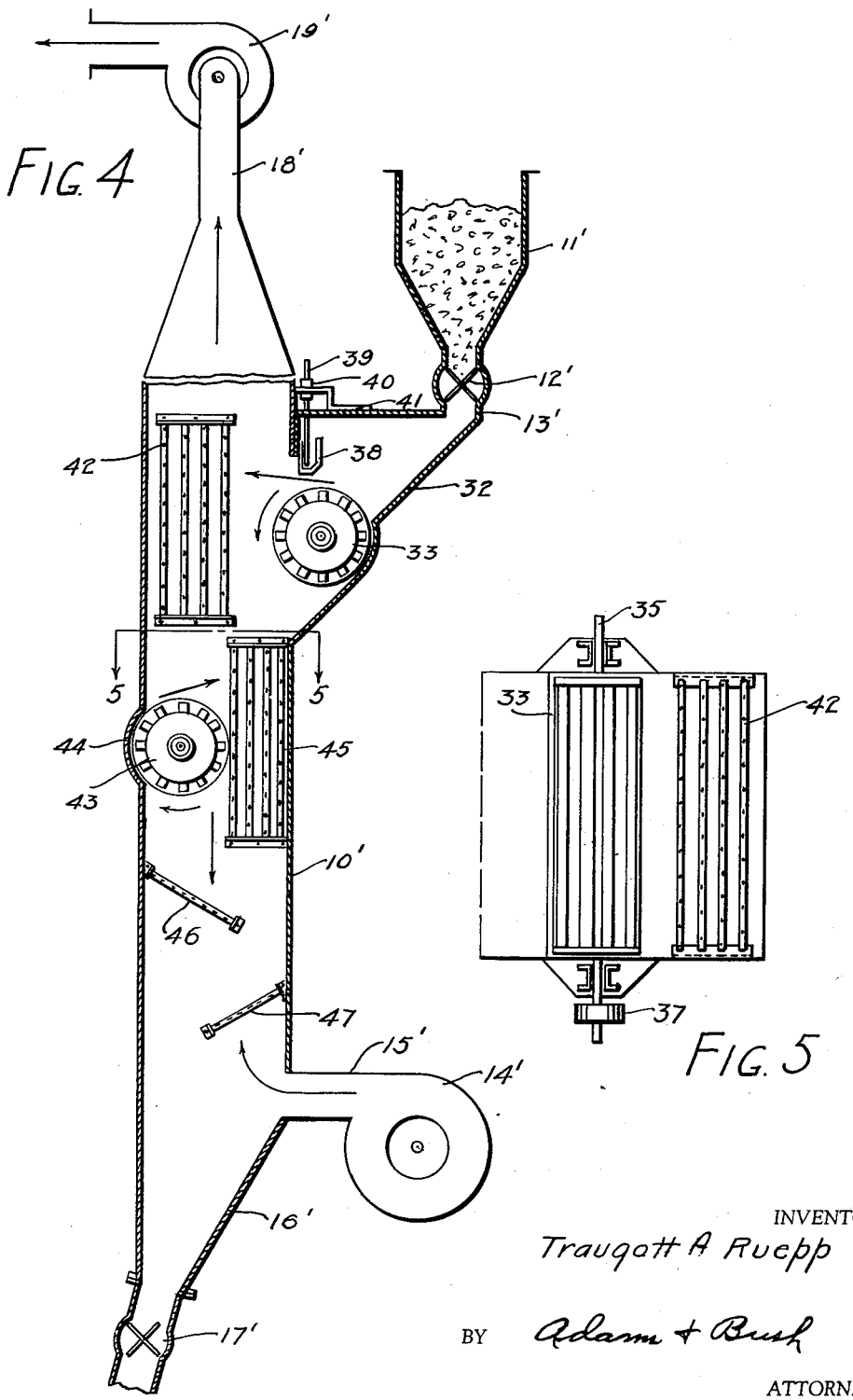

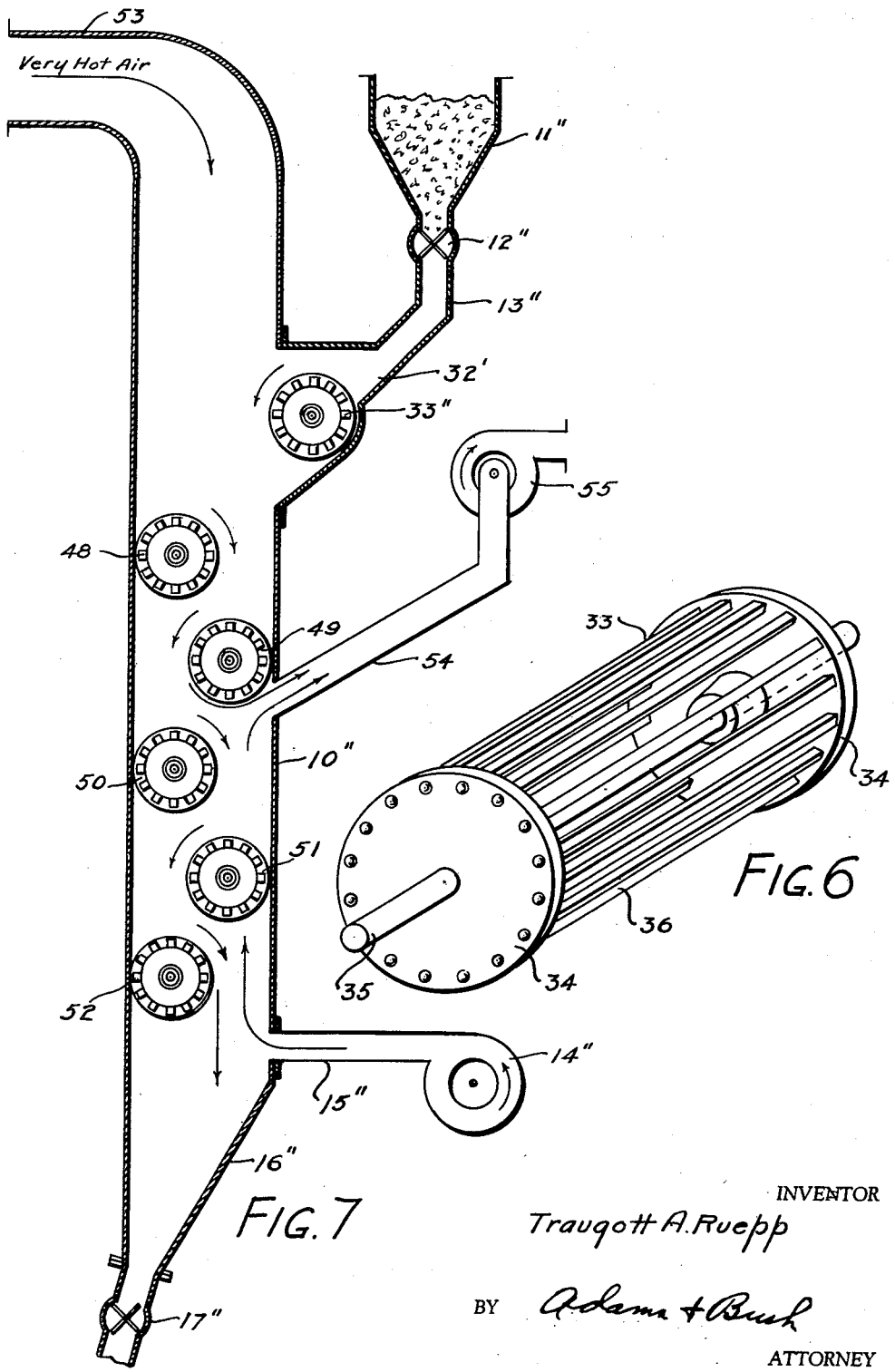

May 25, 1954

T. A. RUEPP 2,679,316

APPARATUS FOR DRYING AND SEPARATING DUST FROM CRUSHED OR COMMINUTED MATERIALS

Filed March 7, 1950

INVENTOR
Traugott A. Ruepp

BY Adams & Bush

ATTORNEY

Patented May 25, 1954

2,679,316

UNITED STATES PATENT OFFICE 2,679,316

APPARATUS FOR DRYING AND SEPARATING DUST FROM CRUSHED OR COMMINUTED MATERIALS

Traugott Arnold Ruepp, Geneva, Switzerland, assignor to Society Jaruza A. G. Chur, Zurich, Switzerland, a Swiss company Application March 7, 1950, Serial No. 148,058

Claims priority, application France March 17, 1949

5 Claims. (Cl. 209—11)

This invention relates to apparatus for treating materials and has more particular reference to apparatus for removing dust and fine particles from crushed or comminuted materials.

In the treatment of crushed or comminuted materials, such as ores and the like, to separate the minute particles and dust from the coarser particles by passing a counter-current stream of air upwardly through a stream of falling material, it is extremely difficult to separate and remove the dust or finer particles from the coarser particles; particularly when the material is damp.

The principal object of the present invention is to provide improved apparatus for separating and removing dust and fine particles from damp materials.

Another object of the invention is to provide apparatus, as above characterized, which employs mechanical devices to impart a shock to the material being treated, as it falls in a downward stream counter-current to a stream of air.

Another object of the invention is to provide apparatus, as above characterized, wherein the mechanical shocking devices are in the form of vibrating screens or rotating squirrel cages.

Another object of the invention is to provide apparatus, as characterized above, wherein the separating stream of air is heated to dry the material.

Another object of the invention is to provide apparatus, as characterized above, wherein a downward current of extremely hot air is introduced into the falling stream of damp material and flows downwardly with the material through a preliminary drying zone or chamber and then is sucked out of the bottom of this zone, leaving the partially dried material to fall through another upwardly flowing current of hot air which is exhausted along with the first stream of hot air.

Other objects and advantages of the invention will appear in the following specification when considered in connection with the accompanying drawings, wherein:

Fig. 1 is a vertical sectional view, partly in elevation, of one embodiment of a dust remover constructed in accordance with the present invention;

Fig. 2 is a sectional view taken on the line 2—2 of Fig. 1;

Fig. 3 is a detail view, partly in section and on an enlarged scale, showing the manner in which the screen assembly is mounted;

Fig. 4 is a sectional view, similar to Fig. 1, showing a modified form of apparatus embodying the invention;

Fig. 5 is a sectional view taken on the line 5—5 of Fig. 4;

Fig. 6 is an enlarged perspective view of a squirrel cage shown in Fig. 5;

Fig. 7 is a sectional view, similar to Fig. 1, showing another modified form of apparatus embodying the invention.

Figure 8:
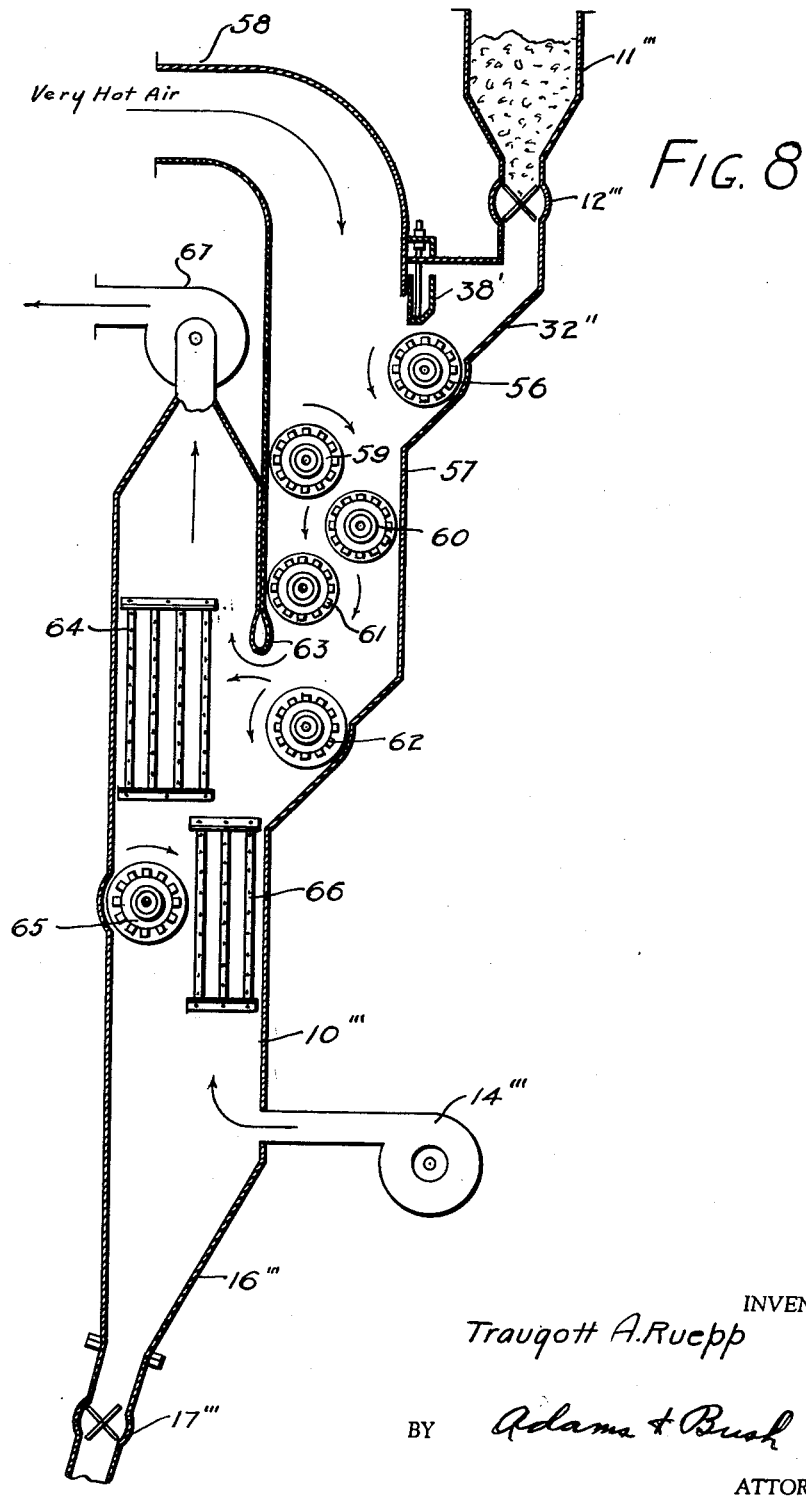
Fig. 8 is a sectional view similar to Fig. 1, showing still another modified form of apparatus embodying the invention.

When comminuted or crushed material, such as ore, is introduced into a separator employing a counter-current of air to remove the dust, the fine dust particles stick on the larger grains or agglomerate when the material reaches a certain degree of dampness and cannot be segregated by the air stream. Segregation is especially difficult if the material contains clay substances which cause the particles to stick to the grains or agglomerate.

In general, the present invention provides improved apparatus for efficiently effecting the complete segregation of fine particles and dust from the grains under such conditions, by employing a succession of mechanical devices to impart shock to the material while it is falling in a tower counter-current to a stream of air. When the material is damp, the air is heated to dry it before separation is effected.

Referring more particularly to the drawings, Fig. 1 shows an embodiment of the invention particularly adapted for the separation of dust particles from relatively dry material. In this example, the apparatus comprises a vertical tower 10 which is preferably generally rectangular in cross section and material is fed into the upper portion of the tower from a hopper 11 having a feed valve or sieve 12 discharging into a conduit 13 connected to the tower on one side. A fan or blower 14 having a conduit 15 connected to the bottom portion of the tower 10, supplies air for effecting the separation of the dust and fine particles from the material. The material from which the dust is separated is delivered to a bottom hopper portion 16, from which it is discharged by a discharge valve 17. The upper end of the tower is shown as being tapered and has a conduit 18 connected to a suction fan 19; although, in some instances, either the suction fan or the blower may be eliminated.

In accordance with this invention, the material delivered to the tower is discharged upon a vibrating screen 20 comprising two coarse-meshed screen elements 21 and 22 with the open meshes staggered with respect to each other. In this instance, the screen elements are shown as being supported upon side plates or frame members 23 at the opposite side walls of the tower. The screen assembly is shown as being supported by coil springs 24 on angle brackets 25 secured to one side wall of the tower. These screen assemblies are adapted to be vibrated by any suitable mechanical means. In this particular embodiment, they are shown as being vibrated by a crank arm 26 on a shaft 27 extending through the side walls of the tower. The shaft carries a pulley 28 at one end adapted to be belt driven. The crank shaft 26 is shown as being confined within vertically slotted guides 29 carried by the side frame members 23 which support the screen elements. The arrangement is such that, as the crank shaft rotates, the screen will be reciprocated in its own plane while the crank is free to rotate within the slot. The spring mounting of the screen assembly will dampen its movement and impart some up and down motion to the screen assembly, as the material is discharged thereon. Thus, the screens impart shocks or jar to the falling material to separate the dust therefrom as the material falls over and through the screens.

As shown in Fig. 1, there are only two pairs of vertically spaced screens. The upper screen assembly is shown as being inclined from the mouth of the delivery conduit 13 downwardly toward the opposite wall of the tower. At the lower end of the screen assembly, the opposite wall of the tower is shown as being bulged outwardly at 30 to provide a somewhat larger cross sectional area at this point to make up for the obstruction caused by the screen assembly and its operating mechanism. This provides for uniform velocity of the air through the tower past the screen assembly. The lower screen assembly is shown as being inclined downwardly from the left hand side wall of the tower and the right hand wall of the tower is bulged outwardly at 31. Obviously, any number of vibrating screens of the type shown may be employed. Also, the air introduced into the tower may be heated to dry the material if it is too wet for complete separation by the shocking action of the screens. It is important that the screens be arranged in zig-zag fashion, as described, to prevent large particles from falling down one side of the tower without striking the next screen below. The metal screen elements have meshes sufficiently large to permit the largest lumps entering the tower to pass through them. The lumps fall from one screen to another and receive a jar every time they strike one of the screen elements.

Referring to the embodiment shown in Fig. 4, that form of the apparatus is generally similar to the form shown in Fig. 1. However, it embodies different mechanical means for imparting shocks or jars to the material fed into the tower. In this instance, the material is fed from the hopper 11' into a chamber 32 connected to the upper portion of the tower 10'. A squirrel cage 33, best shown in Fig. 6, is mounted across the chamber 32 and is arranged to throw the material across the tower. The squirrel cage is shown as being composed of a pair of discs 34 fixedly mounted on a shaft 35 and carrying a plurality of parallel spaced bars 36 secured thereto adjacent to their peripheries. The opposite ends of the shaft 35 extend through the side walls of the hopper 32 and the squirrel cage is adapted to be driven by a pulley 37 mounted on the shaft 35 (see Fig. 5).

The bottom inclined wall of the hopper 32 is shown as being bulged outwardly and rounded adjacent to the squirrel cage, so that the material fed from the hopper will be engaged by the bars 36 and thrown to the left, as viewed in Fig. 4. An adjustable striking anvil 38 is shown as being mounted above and spaced from the squirrel cage 33, so that some of the lumps will be thrown against it to shake loose a portion of the dust. This anvil may be mounted on a screw threaded stem 39 carrying an adjustable nut 40 above an angle bracket 41 on the upper wall of the chamber 32.

The squirrel cage 33 is shown as being arranged to throw the lump transversely across the tower against a series of horizontally spaced vertical screens 42 fixedly secured at their upper and lower ends to the opposite side walls of the tower. These screens may be, and preferably are, similar to the screen elements shown in Fig. 1, and are so arranged that their meshes are in staggered relation so that the lumps of material will strike the cross wires as the material passes through them. It will be noted that the upper set of screens 42 are arranged on the left hand side of the tower. Directly below the upper set of screens there is shown a second squirrel cage 43, identical in construction with the first squirrel cage 33, and the left hand side wall of the tower is bulged outwardly at 44 to increase the cross sectional area of the tower at that point. It will be noted that the two squirrel cages 33 and 43 are driven in opposite directions. Obviously, they may be connected to each other by a cross belt and driven from the same source of power. This second squirrel cage is rotated clockwise to throw the material which falls from and through the screens 42 toward the right against another group of vertical screens 45 exactly like the screens 42.

To keep the falling material from sliding along the side walls of the tower below the lower squirrel cage and screens, a pair of oppositely inclined and vertically spaced grates 46 and 47 are shown as being secured to the opposite side walls of the tower. These grates are of very wide mesh to permit the largest lumps of the material to fall through them. The stream of heated air is delivered by the fan or blower 14' below the lowermost grate 47. Otherwise, the apparatus operates in exactly the same manner as that shown in Fig. 1.

When the material to be treated is very damp and combustible, there is some danger of causing it to ignite when a single stream of very high temperature air is introduced into the bottom of the separating tower. For drying material of this type it is desirable to introduce a stream of very hot air for effecting preliminary drying of the material before it enters the separating zones. Apparatus for drying material of this type is shown in Figs. 7 and 8.

Referring particularly to Fig. 7, the material to be treated is introduced from the hopper 11" onto a squirrel cage 33" in a chamber 32' similar to the one shown in Fig. 4. This squirrel cage is rotated counterclockwise and throws the material to the left against the opposite wall of the tower 10"; thence, the material falls upon and is thrown alternately in opposite directions by a series of vertically spaced and staggered squirrel cages 48, 49, 50, 51 and 52, until it falls into the bottom hopper portion 16" at the bottom of the tower. The lowermost one of the squirrel cages is shown as being arranged slightly above and opposite from the inlet to the tower from the fan conduit 15". Thus, the material is shifted back and forth across the tower from the time it is introduced therein from the hopper. Each of the squirrel cages imparts shocks or jars to the lumps to shake loose the dust.

To effect preliminary drying of the material just before it enters the tower and before it reaches the dust separation zone in the bottom portion of the tower, a stream of very hot air is introduced into the tower through a conduit 53 at the upper end thereof. This air passes downwardly into the tower through the falling lumps of material and partially dries it. The extremely hot air used in the preliminary drying zone is exhausted from the tower through a conduit 54 just below the third squirrel cage 49 and carrying a suction fan 55. Hot air is also introduced into the bottom portion of the tower at a point below the level of the lowermost squirrel cage and passes upwardly through the falling material until it reaches the exhaust conduit 54 where it joins the extremely hot air and is also evacuated by the suction fan 55. Thus the material is treated in separate zones, one above the other, in this particular modification of the invention. Incidentally, the squirrel cages may be, and preferably are, identical with those previously described.

In the modification shown in Fig. 8, the preliminary drying chamber or zone is offset to one side of the separating zone or chamber. By employing this type of apparatus, the overall height of the tower may be reduced. In this embodiment, the material is delivered from the hopper 11''' to a chamber 32'' onto a squirrel cage 56, which throws it against an adjustable anvil 38' similar to the anvil 38 shown in Fig. 4; thence, across the upper portion of a preliminary drying tower 57, to which the very hot air is delivered through a conduit 58 at the upper end thereof. The material is thrown back and forth across the preliminary drying tower by a series of squirrel cages 59, 60, and 61 arranged in staggered relation on opposite sides of the tower and rotating in opposite directions. The lower end of the preliminary drying tower is shown as being connected to an intermediate portion of the vertical separating tower 10'''. A squirrel cage 62 is shown as being arranged at the discharge end of the preliminary drying tower opposite the middle of the opening in the side of the separating tower, so that it will throw the partially dried material across the separating tower and against an anvil member 63, shown as being formed by the walls of the two adjacent towers. However, it will be understood that this anvil may be similar to the anvil 38'. This squirrel cage throws the lumps of material against and through a series of vertically arranged, parallel screens 64 identical with the screens 42 shown in Fig. 4, and arranged adjacent to the side wall of the separating tower opposite from the squirrel cage 62. Thence, the material falls in the tower upon another squirrel cage 65 arranged adjacent to the left hand side of the separating tower, which throws some of the lumps against another series of vertical screens 66 similar to the screens 64. Thence, the material falls into the bottom portion 16''' of the tower, from which it is discharged. Hot air is delivered by the fan 14''' into the bottom portion of the tower 10''' and the dust laden air, together with the extremely hot drying air, is sucked out of the upper end of the separating tower by a suction fan 67. This arrangement also obviates the necessity of connecting an evacuating conduit to the middle of the separating tower and provides distinct preliminary drying and separating zones for the material to be treated.

From the foregoing description, it will be seen that the improved apparatus is very simple in construction and efficient in operation. It can be used for separating dust from dry material or for drying wet material and separating dust therefrom, or simply for drying wet material which has no dust on it.

Obviously, the invention is not restricted to the particular modifications thereof herein shown and described, but is capable of various changes within the scope of the appended claims.

What is claimed is:

1. Apparatus for removing dust from crushed or comminuted materials comprising an elongated vertical tower having a vertical separating chamber of substantially uniform cross sectional area from one end to the other; a hopper communicating with the upper portion of the tower to deliver the material thereto so that it will fall to the bottom of the tower; means for producing a continuous upwardly flowing stream of air through the separating chamber counter-current to the falling material therein to separate and remove the dust particles; a series of vertically spaced rotatable squirrel cage shocking members mounted on opposite sides of the tower in the path of the falling material to jar the dust loose therefrom, said shocking members being so arranged as to distribute the material throughout the entire area of the separating chamber and retard its fall to effect maximum dust separation and with the uppermost squirrel cage shocking member mounted in the material inlet opening to the tower and rotatable in a direction to throw the material across the tower; a group of vertically arranged, horizontally spaced screens mounted in the tower opposite each of said squirrel cage shocking members; means including a conduit communicating with the tower for removing the dust laden air; and a separate discharge conduit at the bottom of the separating chamber for removing the dust free material.

2. Apparatus as set forth in claim 1, wherein an anvil member is mounted above the uppermost squirrel cage shocking member and positioned in the path of the material discharged tangentially therefrom.

3. Apparatus for drying damp, crushed material and removing dust therefrom, comprising a vertical tower having a dust separating chamber therein carrying means for imparting shocks to the material and scattering it throughout the area of the chamber; a separate vertical, material drying tower adjacent to the upper end of the separating tower and connected at its lower end to the upper portion of the separating chamber; a hopper connected to supply the damp material to the upper portion of said drying tower; a series of vertically spaced shocking and scattering members in the drying tower below the material inlet thereto; a conduit on the upper end of the drying tower to deliver a stream of extremely hot drying air downwardly therein; a blower connected to the bottom portion of the separating tower to deliver a stream of separating air upwardly through the falling material; an air exhaust fan connected to the upper end portion of the separating tower to exhaust both streams of air; and a valved discharge conduit at the bottom of the separating tower for removing the dust free material.

4. Apparatus, as set forth in claim 3, wherein the movable shocking members comprise vertically spaced squirrel cages mounted on opposite sides of the dust separating chamber and rotatable in opposite directions to scatter the material throughout the area of the separating chamber, with the uppermost squirrel cage mounted in the material inlet opening to the separating chamber and rotatable in a direction to throw the material across the separating chamber; and wherein a group of vertically arranged and horizontally spaced screens are mounted in the separating chamber opposite each of said squirrel cages.

5. Apparatus, as set forth in claim 3, wherein the shocking and scattering members in the drying tower comprise squirrel cages mounted on opposite sides of said tower and rotatable in opposite directions to scatter the material throughout the area of said drying tower.

References Cited in the file of this patent

UNITED STATES PATENTS

| Number | Name | Date |
|---|---|---|
| 169,308 | Sower | Oct. 26, 1875 |
| 458,713 | Howland | Sept. 1, 1891 |
| 2,017,586 | Cottee | Oct. 15, 1935 |
| 2,395,090 | Arnold | Feb. 19, 1946 |
| 2,430,686 | Roeder | Nov. 11, 1947 |
| 2,446,952 | Randolph | Aug. 10, 1948 |

FOREIGN PATENTS

| Number | Country | Date |
|---|---|---|
| 474,557 | Great Britain | Nov. 3, 1937 |
| 358,329 | Great Britain | Oct. 8, 1931 |
| 638,800 | Germany | Nov. 23, 1936 |